US008730798B2

(12) United States Patent
Kliger et al.

(10) Patent No.: US 8,730,798 B2
(45) Date of Patent: May 20, 2014

(54) TRANSMITTER CHANNEL THROUGHPUT IN AN INFORMATION NETWORK (75) Inventors: Avi Kliger, Ramat Gan (IL); Philippe Klein, Jerusalem (IL); Yitshak Ohana, Givat Zeev (IL)

(73) Assignee: Broadcom Corporation, Irvine, CA (US)

( * ) Notice: Subject to any disclaimer, the term of this patent is extended or adjusted under 35 U.S.C. 154(b) by 816 days.

(21) Appl. No.: 12/774,326

(22) Filed: May 5, 2010

(65) Prior Publication Data
US 2010/0284474 A1 Nov. 11, 2010

Related U.S. Application Data (60) Provisional application No. 61/175,496, filed on May 5, 2009.

(51) Int. Cl.
*H04L 12/26* (2006.01)
*H04L 12/56* (2006.01)

(52) U.S. Cl.
CPC .................. *H04L 47/15* (2013.01); *H04L 47/30* (2013.01); *H04L 47/10* (2013.01)
USPC ........................................................ 370/230

(58) Field of Classification Search
CPC ......... H04L 47/10; H04L 47/30; H04L 47/11; H04L 47/12
See application file for complete search history.

(56) References Cited

U.S. PATENT DOCUMENTS

| 3,836,888 | A | 9/1974 | Boenke et al. |
| 4,413,229 | A | 11/1983 | Grant |
| 4,536,875 | A | 8/1985 | Kume et al. |
| 4,608,685 | A | 8/1986 | Jain et al. |
| 4,893,326 | A | 1/1990 | Duran et al. |
| 5,052,029 | A | 9/1991 | James et al. |
| 5,170,415 | A | 12/1992 | Yoshida et al. |
| 5,343,240 | A | 8/1994 | Yu |
| 5,421,030 | A | 5/1995 | Baran |
| 5,440,335 | A | 8/1995 | Beveridge |

(Continued)

FOREIGN PATENT DOCUMENTS

| CN | 1422043 | 6/2003 |
| CN | 1588827 | 8/2004 |

(Continued)

OTHER PUBLICATIONS

International Search Report for International Application No. PCT/US03/27253 dated Dec. 30, 2003 (4 pgs.).

(Continued)

*Primary Examiner* — Phuc Tran
(74) *Attorney, Agent, or Firm* — McDermott Will & Emery LLP (57) ABSTRACT

Apparatus and methods for transmitting information over a home coax network. The apparatus and methods may involve a physical layer frequency domain signal preprocessor and a physical layer time domain signal transmitter. The transmitter may be configured to receive the signal from the preprocessor and transmit the signal over coax that is in radiofrequency communication with a plurality of network nodes, the transmitter having a first transmission channel and a second transmission channel. The signal may be received by a receiver on the network. The receiver may have a MAC-to-PHY interface that is configured to receive signals from single-transmission-channel transmitters.

25 Claims, 4 Drawing Sheets

(56) References Cited

U.S. PATENT DOCUMENTS

| | | |
|---|---|---|
| 5,570,355 A | 10/1996 | Dail et al. |
| 5,638,374 A | 6/1997 | Heath |
| 5,671,220 A | 9/1997 | Tonomura |
| 5,694,437 A * | 12/1997 | Yang et al. .................... 375/346 |
| 5,796,739 A | 8/1998 | Kim et al. |
| 5,802,173 A | 9/1998 | Hamilton-Piercy et al. |
| 5,805,591 A | 9/1998 | Naboulsi et al. |
| 5,805,806 A | 9/1998 | McArthur |
| 5,815,662 A | 9/1998 | Ong |
| 5,822,677 A | 10/1998 | Peyrovian |
| 5,822,678 A | 10/1998 | Evanyk |
| 5,845,190 A | 12/1998 | Bushue et al. |
| 5,850,400 A | 12/1998 | Eames et al. |
| 5,854,887 A | 12/1998 | Kindell et al. |
| 5,856,975 A | 1/1999 | Rostoker et al. |
| 5,877,821 A | 3/1999 | Newlin et al. |
| 5,886,732 A | 3/1999 | Humpleman |
| 5,896,556 A | 4/1999 | Moreland et al. |
| 5,898,684 A * | 4/1999 | Currivan et al. ............ 370/350 |
| 5,917,624 A | 6/1999 | Wagner |
| 5,930,493 A | 7/1999 | Ottesen et al. |
| 5,963,844 A | 10/1999 | Dail |
| 5,982,784 A | 11/1999 | Bell |
| 6,006,271 A * | 12/1999 | Grabiec et al. .............. 709/235 |
| 6,009,465 A | 12/1999 | Decker et al. |
| 6,028,860 A | 2/2000 | Laubach et al. |
| 6,055,242 A | 4/2000 | Doshi et al. |
| 6,055,268 A * | 4/2000 | Timm et al. .................. 375/229 |
| 6,069,588 A | 5/2000 | O'Neill, Jr. |
| 6,081,519 A | 6/2000 | Petler |
| 6,081,533 A | 6/2000 | Laubach et al. |
| 6,111,911 A | 8/2000 | Sanderford et al. |
| 6,118,762 A | 9/2000 | Nomura et al. |
| 6,157,645 A | 12/2000 | Shobatake |
| 6,167,120 A | 12/2000 | Kikinis |
| 6,192,070 B1 | 2/2001 | Poon et al. |
| 6,219,409 B1 | 4/2001 | Smith et al. |
| 6,229,818 B1 | 5/2001 | Bell |
| 6,243,413 B1 | 6/2001 | Beukema |
| 6,304,552 B1 | 10/2001 | Chapman et al. |
| 6,307,862 B1 | 10/2001 | Silverman |
| 6,434,151 B1 | 8/2002 | Caves et al. |
| 6,466,651 B1 | 10/2002 | Dailey |
| 6,481,013 B1 | 11/2002 | Dinwiddie et al. |
| 6,526,070 B1 | 2/2003 | Bernath et al. |
| 6,553,568 B1 | 4/2003 | Fijolek et al. |
| 6,563,829 B1 | 5/2003 | Lyles et al. |
| 6,567,654 B1 | 5/2003 | Coronel Arredondo et al. |
| 6,611,537 B1 | 8/2003 | Edens et al. |
| 6,622,304 B1 | 9/2003 | Carhart |
| 6,637,030 B1 | 10/2003 | Klein |
| 6,650,624 B1 | 11/2003 | Quigley et al. |
| 6,745,392 B1 | 6/2004 | Basawapatna et al. |
| 6,757,522 B1 * | 6/2004 | Naegeli et al. .............. 455/67.11 |
| 6,763,032 B1 | 7/2004 | Rabenko et al. |
| 6,785,296 B1 | 8/2004 | Bell |
| 6,816,500 B1 | 11/2004 | Mannette et al. |
| 6,831,899 B1 | 12/2004 | Roy |
| 6,836,515 B1 | 12/2004 | Kay et al. |
| 6,859,899 B2 | 2/2005 | Shalvi et al. |
| 6,862,270 B1 | 3/2005 | Ho |
| 6,877,043 B2 | 4/2005 | Mallory et al. |
| 6,877,166 B1 | 4/2005 | Roeck et al. |
| 6,898,210 B1 | 5/2005 | Cheng et al. |
| 6,930,989 B1 | 8/2005 | Jones IV et al. |
| 6,940,833 B2 | 9/2005 | Jonas et al. |
| 6,950,399 B1 | 9/2005 | Bushmitch et al. |
| 6,961,314 B1 | 11/2005 | Quigley et al. |
| 6,985,437 B1 | 1/2006 | Vogel |
| 6,996,198 B2 | 2/2006 | Cvetkovic |
| 7,035,270 B2 | 4/2006 | Moore et al. |
| 7,065,779 B1 | 6/2006 | Crocker et al. |
| 7,089,580 B1 | 8/2006 | Vogel et al. |
| 7,116,685 B2 | 10/2006 | Brown et al. |
| 7,127,734 B1 | 10/2006 | Amit |
| 7,133,697 B2 | 11/2006 | Judd et al. |
| 7,142,553 B1 | 11/2006 | Ojard et al. |
| 7,146,632 B2 | 12/2006 | Miller |
| 7,149,220 B2 | 12/2006 | Beukema et al. |
| 7,194,041 B2 | 3/2007 | Kadous |
| 7,292,527 B2 | 11/2007 | Zhou et al. |
| 7,296,083 B2 | 11/2007 | Barham et al. |
| 7,327,754 B2 | 2/2008 | Mills et al. |
| 7,372,853 B2 | 5/2008 | Sharma et al. |
| 7,460,543 B2 | 12/2008 | Malik et al. |
| 7,487,532 B2 | 2/2009 | Robertson et al. |
| 7,532,642 B1 | 5/2009 | Peacock |
| 7,532,693 B1 | 5/2009 | Narasimhan |
| 7,548,549 B2 * | 6/2009 | Bergeron et al. ............ 370/419 |
| 7,555,064 B2 | 6/2009 | Beadle |
| 7,574,615 B2 | 8/2009 | Weng et al. |
| 7,606,256 B2 | 10/2009 | Vitebsky et al. |
| 7,652,527 B2 | 1/2010 | Ido et al. |
| 7,653,164 B2 | 1/2010 | Lin et al. |
| 7,664,065 B2 | 2/2010 | Lu |
| 7,675,970 B2 | 3/2010 | Nemlroff et al. |
| 7,860,092 B2 | 12/2010 | Yoon et al. |
| 7,916,756 B2 | 3/2011 | Atsumi et al. |
| 8,184,550 B2 | 5/2012 | Beck et al. |
| 8,199,684 B2 * | 6/2012 | Eng ............................ 370/297 |
| 8,270,517 B2 * | 9/2012 | van Zelst et al. ............. 375/267 |
| 8,326,906 B2 * | 12/2012 | Tsatsanis et al. ............ 708/321 |
| 2001/0039660 A1 | 11/2001 | Vasilevsky |
| 2002/0010562 A1 | 1/2002 | Schleiss et al. |
| 2002/0021465 A1 | 2/2002 | Moore et al. |
| 2002/0059623 A1 | 5/2002 | Rodriguez et al. |
| 2002/0059634 A1 | 5/2002 | Terry et al. |
| 2002/0069417 A1 | 6/2002 | Kliger |
| 2002/0078247 A1 | 6/2002 | Lu et al. |
| 2002/0078249 A1 | 6/2002 | Lu et al. |
| 2002/0097821 A1 | 7/2002 | Hebron et al. |
| 2002/0105970 A1 | 8/2002 | Shvodian |
| 2002/0136231 A1 | 9/2002 | Leathurbury et al. |
| 2002/0141347 A1 | 10/2002 | Harp et al. |
| 2002/0150155 A1 | 10/2002 | Florentin et al. |
| 2002/0166124 A1 | 11/2002 | Gurantz et al. |
| 2002/0174423 A1 | 11/2002 | Fifield et al. |
| 2002/0194605 A1 | 12/2002 | Cohen et al. |
| 2003/0013453 A1 | 1/2003 | Lavaud et al. |
| 2003/0016751 A1 | 1/2003 | Vetro et al. |
| 2003/0022683 A1 | 1/2003 | Beckmann et al. |
| 2003/0060207 A1 | 3/2003 | Sugaya et al. |
| 2003/0063563 A1 | 4/2003 | Kowalski |
| 2003/0066082 A1 | 4/2003 | Kliger |
| 2003/0099253 A1 | 5/2003 | Kim |
| 2003/0152059 A1 | 8/2003 | Odman |
| 2003/0169769 A1 | 9/2003 | Ho et al. |
| 2003/0193619 A1 | 10/2003 | Farrand |
| 2003/0198244 A1 | 10/2003 | Ho et al. |
| 2004/0004934 A1 | 1/2004 | Zhu et al. |
| 2004/0037366 A1 | 2/2004 | Crawford |
| 2004/0047284 A1 | 3/2004 | Eidson |
| 2004/0107445 A1 | 6/2004 | Amit |
| 2004/0163120 A1 | 8/2004 | Rabenko et al. |
| 2004/0172658 A1 | 9/2004 | Rakib et al. |
| 2004/0177381 A1 | 9/2004 | Kliger |
| 2004/0224715 A1 | 11/2004 | Rosenlof et al. |
| 2004/0258062 A1 | 12/2004 | Narvaez |
| 2005/0015703 A1 | 1/2005 | Terry et al. |
| 2005/0097196 A1 | 5/2005 | Wronski et al. |
| 2005/0152350 A1 | 7/2005 | Sung et al. |
| 2005/0152359 A1 | 7/2005 | Giesberts et al. |
| 2005/0175027 A1 | 8/2005 | Miller et al. |
| 2005/0204066 A9 | 9/2005 | Cohen et al. |
| 2005/0213405 A1 | 9/2005 | Stopler |
| 2006/0059400 A1 | 3/2006 | Clark et al. |
| 2006/0062250 A1 | 3/2006 | Payne |
| 2006/0068708 A1 | 3/2006 | Dessert et al. |
| 2006/0078001 A1 | 4/2006 | Chandra et al. |
| 2006/0104201 A1 | 5/2006 | Sundberg et al. |
| 2006/0146861 A1 * | 7/2006 | Maeda ......................... 370/448 |
| 2006/0256799 A1 | 11/2006 | Eng |
| 2006/0256818 A1 | 11/2006 | Shvodian et al. |
| 2006/0268934 A1 | 11/2006 | Shimizu et al. |

(56) References Cited

U.S. PATENT DOCUMENTS

| | | |
|---|---|---|
| 2006/0280194 A1 | 12/2006 | Jang et al. |
| 2007/0025317 A1 | 2/2007 | Bolinth et al. |
| 2007/0040947 A1 | 2/2007 | Koga |
| 2007/0127373 A1 | 6/2007 | Ho et al. |
| 2007/0160213 A1 | 7/2007 | Un et al. |
| 2007/0171919 A1 | 7/2007 | Godman et al. |
| 2007/0183786 A1 | 8/2007 | Hinosugi et al. |
| 2007/0206551 A1 | 9/2007 | Moorti et al. |
| 2007/0217436 A1 | 9/2007 | Markley et al. |
| 2007/0253379 A1 | 11/2007 | Kumar et al. |
| 2007/0286121 A1 | 12/2007 | Kolakowski et al. |
| 2008/0037487 A1 | 2/2008 | Li et al. |
| 2008/0037589 A1 | 2/2008 | Kliger |
| 2008/0080369 A1 | 4/2008 | Sumioka et al. |
| 2008/0089268 A1 | 4/2008 | Kinder et al. |
| 2008/0117919 A1 | 5/2008 | Kliger |
| 2008/0117929 A1 | 5/2008 | Kliger |
| 2008/0130779 A1 | 6/2008 | Levi |
| 2008/0178229 A1 | 7/2008 | Kliger |
| 2008/0189431 A1 | 8/2008 | Hyslop et al. |
| 2008/0212591 A1 | 9/2008 | Wu et al. |
| 2008/0225832 A1 | 9/2008 | Kaplan et al. |
| 2008/0238016 A1 | 10/2008 | Chen et al. |
| 2008/0259957 A1 | 10/2008 | Kliger |
| 2008/0271094 A1 | 10/2008 | Kliger |
| 2008/0273591 A1 | 11/2008 | Brooks et al. |
| 2008/0279219 A1 | 11/2008 | Wu et al. |
| 2008/0298241 A1 | 12/2008 | Ohana |
| 2009/0010263 A1 | 1/2009 | Ma et al. |
| 2009/0063878 A1 | 3/2009 | Schmidt et al. |
| 2009/0092154 A1 | 4/2009 | Malik et al. |
| 2009/0106801 A1 | 4/2009 | Horii |
| 2009/0122901 A1 | 5/2009 | Choi et al. |
| 2009/0165070 A1 | 6/2009 | McMullin |
| 2009/0217325 A1 | 8/2009 | Kliger |
| 2009/0252172 A1 | 10/2009 | Hare |
| 2009/0254794 A1 | 10/2009 | Malik et al. |
| 2009/0257483 A1 | 10/2009 | French et al. |
| 2009/0279643 A1 | 11/2009 | Shusterman |
| 2009/0285212 A1 | 11/2009 | Chu et al. |
| 2009/0296578 A1 | 12/2009 | Bernard et al. |
| 2009/0316589 A1 | 12/2009 | Shafeeu |
| 2010/0031297 A1 | 2/2010 | Klein |
| 2010/0080312 A1 | 4/2010 | Moffatt et al. |
| 2010/0091920 A1 * | 4/2010 | Alexander et al. ............ 375/350 |
| 2010/0150016 A1 | 6/2010 | Barr |
| 2010/0158013 A1 | 6/2010 | Kliger |
| 2010/0158015 A1 | 6/2010 | Wu |
| 2010/0158021 A1 | 6/2010 | Kliger |
| 2010/0158022 A1 | 6/2010 | Kliger |
| 2010/0162329 A1 | 6/2010 | Ford et al. |
| 2010/0174824 A1 | 7/2010 | Aloni et al. |
| 2010/0185731 A1 | 7/2010 | Wu |
| 2010/0185759 A1 | 7/2010 | Wu |
| 2010/0238932 A1 | 9/2010 | Kliger |
| 2010/0246586 A1 | 9/2010 | Ohana |
| 2010/0254278 A1 | 10/2010 | Kliger |
| 2010/0254402 A1 | 10/2010 | Kliger |
| 2010/0281195 A1 | 11/2010 | Daniel et al. |
| 2010/0290461 A1 | 11/2010 | Kliger |
| 2010/0322134 A1 | 12/2010 | Wu |
| 2011/0001833 A1 | 1/2011 | Grinkemeyer et al. |
| 2011/0013633 A1 | 1/2011 | Klein et al. |
| 2011/0080850 A1 | 4/2011 | Klein et al. |
| 2011/0205891 A1 | 8/2011 | Kliger et al. |
| 2011/0206042 A1 | 8/2011 | Tarrab et al. |
| 2011/0310907 A1 | 12/2011 | Klein et al. |
| 2012/0134511 A1 * | 5/2012 | Vilermo et al. ............... 381/107 |

FOREIGN PATENT DOCUMENTS

| | | |
|---|---|---|
| EP | 0 385695 | 9/1990 |
| EP | 0 622926 | 11/1994 |
| EP | 1501326 | 1/2005 |
| JP | 60160231 | 8/1985 |
| WO | WO 98/27748 | 6/1998 |
| WO | WO 98/31133 | 7/1998 |
| WO | WO 99/35753 | 7/1999 |
| WO | WO 99/46734 | 9/1999 |
| WO | WO 00/31725 | 6/2000 |
| WO | WO 00/55843 | 9/2000 |
| WO | WO 01/80030 | 10/2001 |
| WO | WO 02/19623 | 3/2002 |

OTHER PUBLICATIONS

International Search Report for International Application No. PCT/US03/27254 dated Feb. 3, 2004 (5 pgs.).

Multichannel News , MoCA Brewing Up Bigger Bandwidth, Dec. 15, 2008 Interview with CTO Anton Monk, http://www.multichannel.com/article/160878-MoCa_Brewing_Up_bigger_Bandwidth.php downloaded on Mar. 29, 2009.

Ovadia S., "MoCA: Ubiquitous Multimedia Networking in the Home," Proceedings of the Spie—The International Society for optical engineering USA, [Online] 2007, XP002584642 ISSN: 0277-786X, Retrieved on Jul. 28, 2010 from the Internet: URL: http://spiedl.aip.org/getpdf/servlet/getPDFServlet?filetype=pdf&id=PSISDG006776000001677600C00000&idtype=cvips&prog=normal>, as cited in European Search Report.

"Home Networking on Coax for Video and Multimedia, Overview for IEEE 802.1AVB", Shlomo Ovadia, San Ramon/California, May 30, 2007.

"Microtune Introduces Industry's First 1-GHZ Cable Tuners Compatible with MoCA—Home Networking Standard", Business Wire, San Francisco, California, Mar. 19, 2007.

* cited by examiner

TRANSMITTER CHANNEL THROUGHPUT IN AN INFORMATION NETWORK

CROSS REFERENCE TO RELATED APPLICATION

This application claims the benefit of U.S. Application No. 61/175,496, filed on May 5, 2009, which is hereby incorporated by reference herein in its entirety.

FIELD OF TECHNOLOGY

The present invention relates generally to information networks and specifically to transmitting information such as media information over communication lines such as coaxial cable (hereinafter "coax"), thereby to form a communications network.

BACKGROUND

Home networking over coax is a known technology which has vast commercial potential.

Home network technologies having a packet aggregation functionality are known generally. The Multimedia over Coax Alliance (MoCA™), at its website mocalliance.org, provides an example of a suitable specification (MoCA 1.0) for networking of digital video and entertainment through existing coaxial cable in the home which has been distributed to an open membership. Packet aggregation functionality is not provided. MoCA 1.0 specification is incorporated by reference herein in its entirety.

Home networking over coax taps into the vast amount of unused bandwidth available on in-home coax. More than 70% of homes in the United States have coax already installed in the home infrastructure. Many have existing coax in one or more primary entertainment consumption locations such as family rooms, media rooms and master bedrooms—ideal for deploying networks. Home networking technology allows homeowners to utilize this infrastructure as a networking system and to deliver other entertainment and information programming with high QoS (Quality of Service).

The technology underlying home networking over coax provides high speed, high QoS, and the innate security of a shielded, wired connection combined with state of the art packet-level encryption. Coax is designed for carrying high bandwidth video. Today, it is regularly used to securely deliver millions of dollars of pay per view and premium video content on a daily basis. Home networking over coax can also be used as a backbone for multiple wireless access points used to extend the reach of wireless network throughout a consumer's entire home.

Home networking over coax provides a consistent, high throughput, high quality connection through the existing coaxial cables to the places where the video devices currently reside in the home without affecting the existing analog or digital services present on the cable. Home networking over coax provides a primary link for digital entertainment, and may also act in concert with other wired and wireless networks to extend the entertainment experience throughout the home.

Currently, home networking over coax works with access technologies such as ADSL and VDSL services or Fiber to the Home (FTTH), that typically enter the home on a twisted pair or on an optical fiber, operating in a frequency band from a few hundred kilohertz to 8.5 MHz for ADSL and 12 MHz for VDSL. As services reach the home via xDSL or FTTH, they may be routed via home networking over coax technology and the in-home coax to the video devices. Cable functionalities, such as video, voice and Internet access, may be provided to homes, via coaxial cable, by cable operators, and use coaxial cables running within the homes to reach individual cable service consuming devices locating in various rooms within the home. Typically, home networking over coax type functionalities run in parallel with the cable functionalities, on different frequencies.

The coax infrastructure inside the house typically includes coaxial wires and splitters. Splitters used in homes typically have one input and two or more outputs and are designed to transfer signals from input to outputs in the forward direction, or from outputs to input in the backward direction and to isolate splitter outputs and prevent signals from flowing room/outlet to room/outlet. Isolation is useful in order to a) reduce interference from other devices and b) maximize power transfer from Point Of Entry (POE) to outlets for best TV reception.

The MoCA technology is specifically designed to go backwards through splitters (insertion) and go from splitter output to output (isolation). All outlets in a house can be reached from each other by a single "isolation jump" and a number of "insertion jumps". Typically isolation jumps have an attenuation of 5 to 40 dB and each insertion jump attenuates approximately 3 dB. MoCA has a dynamic range in excess of 55 dB while supporting 200 Mbps throughput. Therefore MoCA can work effectively through a significant number of splitters.

MoCA is a managed network that is unlike some other home networking technologies. It is specifically designed to support streaming video without packet loss, thus providing very high video quality between outlets.

Digital cable programming is delivered with threshold Packet Error Rate (PER) of below 1e-6. The home network should preferably have similar or better performance so as not to degrade viewing.

Later versions of the MoCA specification may require or permit that a MoCA device transmit and receive on more than one channel.

The disclosures of any publications and patent documents mentioned in the specification, and of the publications and patent documents cited therein directly or indirectly, are hereby incorporated by reference.

SUMMARY OF THE INVENTION

A system and/or method for transmitting information over a home communications network, substantially as shown in and/or described in connection with at least one of the figures, as set forth more completely in the claims.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Apparatus and methods for transmitting information over a home coax network are provided. The apparatus and methods may involve a physical layer frequency domain signal preprocessor; and a physical layer time domain signal transmitter. The transmitter may be configured to receive the signal from the preprocessor and transmit the signal over coax that is in radiofrequency communication with a plurality of network nodes, the transmitter having a first transmission channel and a second transmission channel.

The frequency domain preprocessor may receive a signal that may be a bit stream. The preprocessor may include one or more of an encryption module, which may be based on the advanced encryption standard, a forward error correction module, a low density parity check encoder, a symbol padding module, an adaptive constellation multitone padding module, a byte scrambler and a frequency domain preamble generator.

The preprocessor may transmit the signal to the transmitter. The transmitter may be in communication with a network. The network may include a coax backbone. The network may be a MoCA 1 network. The network may be a MoCA 2 network. the network may include one or more nodes that conform to the MoCA 1 specification and one or more nodes that conform to the MoCA 2 specification.

In some embodiments, the first transmission channel may be configured to transmit a first portion of the signal to the coax; and the second transmission channel may be configured to transmit a second portion of the signal to the coax.

The apparatus may include a semiconductor chip. The first and second channels may be integral to the chip. In some embodiments, the first channel may be substantially parallel to the second channel.

In MoCA-based networks, there may be one or more defined communication bands. In some embodiments, the first channel and the second channel may communicate in the same band.

The first channel may transmit the first portion of the signal at the same time as the second channel transmits the second portion of the signal. In some embodiments, transmission of the first portion and the second portion may be simultaneous. In some embodiments, concurrent transmission on the first and second channels may provide transmitter throughput that is greater than the throughput of a single channel transmitter.

Some embodiments may include an oscillator. The oscillator may provide a timing signal to the first and second transmitter channels. The first and second transmitter channels may transmit the signal based on the timing signal.

In some embodiments, each of the first and second portions of the signal may include a preamble. The first portion may include a first preamble. The second portion may include a second preamble. The first channel may be configured to transmit the first preamble in response to a trigger in the timing signal. The second channel may be configured to transmit the second preamble in response to the same trigger.

In some embodiments, the first and second channels may transmit their respective signal portions on different carrier frequencies. The first channel may be configured to transmit the first portion at a first frequency. The second channel may be configured to transmit the second portion at a second frequency. The first and second frequencies may be different.

Some embodiments may include a subcarrier mapper. The subcarrier mapper may be configured to define the first portion and the second portion based on bit loading. For example, the subcarrier mapper may direct portions of the signal to the transmission channels in a manner that distributes bit loading between the channels.

In some coax-based home networks, such as some MoCA networks, each physical ("PHY") RF transmission channel may be configured to transmit using 512 subcarriers over a 100 MHz transmission spectrum. The signal-to-noise ratio ("SNR") of a sub-carrier depends in part on the sub-carrier frequency. Higher SNR ratios may permit higher bit loading. The subcarrier mapper may be configured to execute an algorithm that allocates bits to the different sub-carriers based on the SNR of each sub-carrier.

Each of the first and second transmission channels may be configured to transmit using 512 sub-carriers. When both first and second transmission channels are present in a transmitter, 2×512=1,024 subcarriers may be available for transmission. When n transmission channels are present in a transmitter, n×512=512n, n=1, 2, 3, ..., N, subcarriers may be available for transmission. Total number of subcarriers, N, may be any suitable number. Under some home networking specifications, such as MoCA 1 and MoCA 2, and any other suitable specifications, MAC level logic and protocols may be the same for different values of N. For example, a MAC transmission protocol that is configured for transmission when N=1 may also be executed when N=2 or N=3.

Each of the first and second transmission channels may include one or more of a BIN scrambler, an ACMT modulator, an OFDM modulator, a DAC and anti-aliasing filter, and an RF converter.

Some embodiments may include an output buffer that is in communication with the time domain signal preprocessor. The buffer may be configured to store output from the preprocessor. For example, the buffer may store first output from the preprocessor. The first output may be the first signal portion.

Some embodiments may include control logic that transfers the first output from the buffer to the first transmission channel. The transfer may occur at substantially the same time as the preprocessor transfers second output, corresponding to the second portion, to the second transmission channel.

Methods in accordance with the principles of the invention may include a method for transmitting information over a home network. The method may include culling from a digital home network information signal first information packets and second information packets; transmitting the first information packets over coax that is in radiofrequency communication with a plurality of network nodes; and transmitting the second information packets. The information packets may be transmitted in such a manner that, when a MAC interface is in communication with the home network, the first information packets and the second information packets are configured to transit the MAC interface. The MAC interface may be a MoCA MAC interface.

In some embodiments, when the first and second information packets are present on a carrier frequency in a coax conductor, they correspond operationally to a portion of a MoCA 2 1024-sub-carrier signal.

In some embodiments, the method may include preprocessing and then buffering the first information packets. The method may include performing frequency domain preprocessing on the second information packets while the first information packets are buffered.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
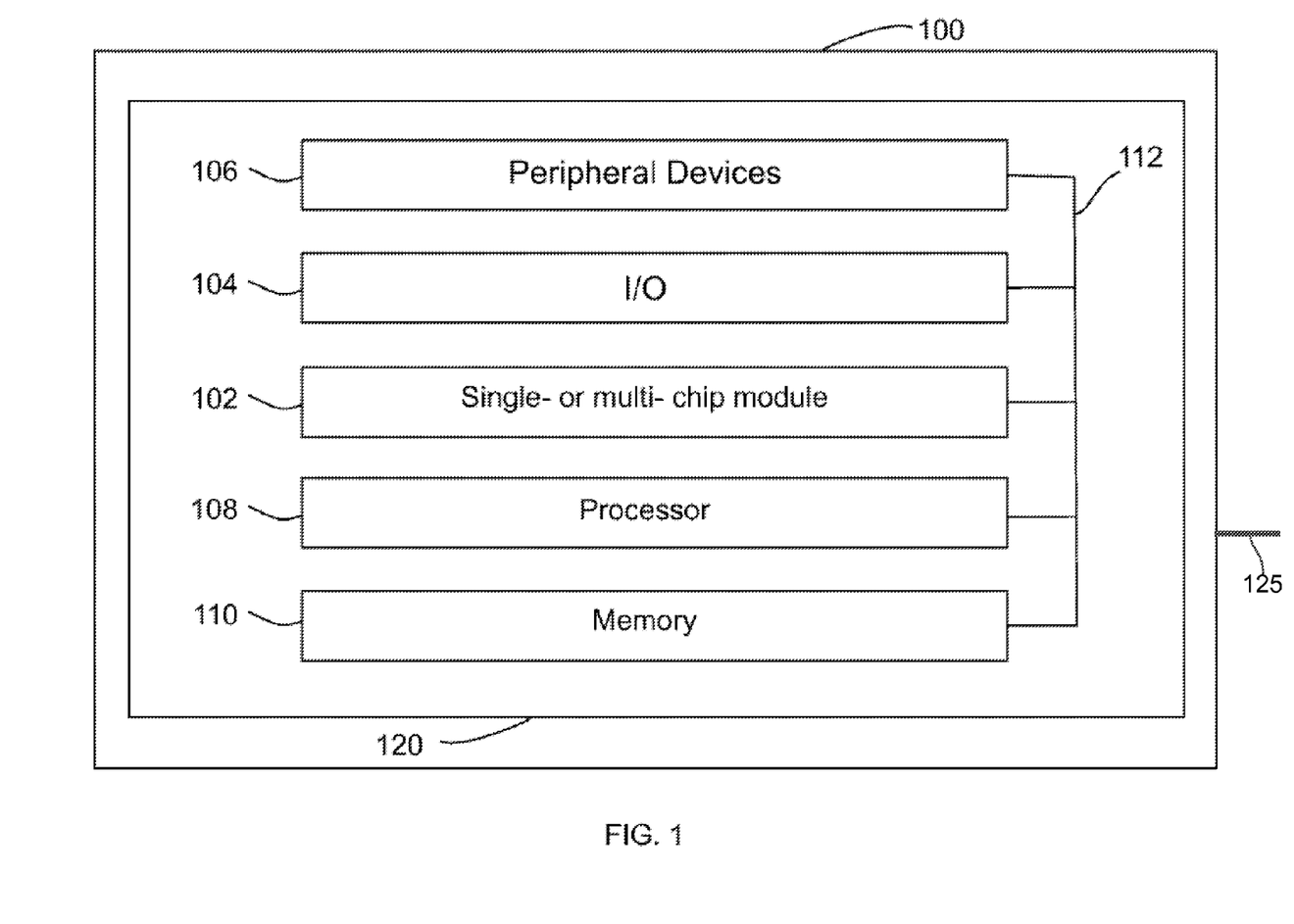
FIG. 1 shows a schematic diagram of an illustrative single or multi-chip device that may be used in accordance with principles of the invention.

FIG. 1 shows a single or multi-chip module 102 according to the invention, which can be one or more integrated circuits, in an illustrative data processing system 100 according to the invention. Data processing system 100 may include one or more of the following components: I/O circuitry 104, peripheral devices 106, processor 108 and memory 110. These components may be coupled together by a system bus or other interconnections 112 and are disposed on a circuit board 120 in the data processing system 100 that may be in communication with a coax medium 125 via an interface.

For the sake of clarity, the foregoing description, including specific examples of parameter values provided, is sometimes specific to certain protocols such as those identified with the name MOCA™ and/or Ethernet protocols. However, this is not intended to be limiting and the invention may be suitably generalized to other protocols and/or other packet protocols. The use of terms that may be specific to a particular protocol such as that identified by the name MOCA™ or Ethernet to describe a particular feature or embodiment is not intended to limit the scope of that feature or embodiment to that protocol specifically; insteadm the terms are used generally and are each intended to include parallel and similar terms defined under other protocols.

It is appreciated that software components of the present invention including programs and data may, if desired, be implemented in ROM (read-only-memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Features of the present invention which are described in the context of separate embodiments may be provided in combination in a single embodiment. Conversely, features of the invention which are described for brevity in the context of a single embodiment may be provided separately or in any suitable subcombination.

As will be appreciated by one of skill in the art, the invention described herein may be embodied in whole or in part as a method, a data processing system, chip, component or device, or a computer program product. Accordingly, the invention may take the form of an entirely hardware embodiment, an entirely software embodiment or an embodiment combining software, hardware and any other suitable approach or apparatus.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Figure 2:
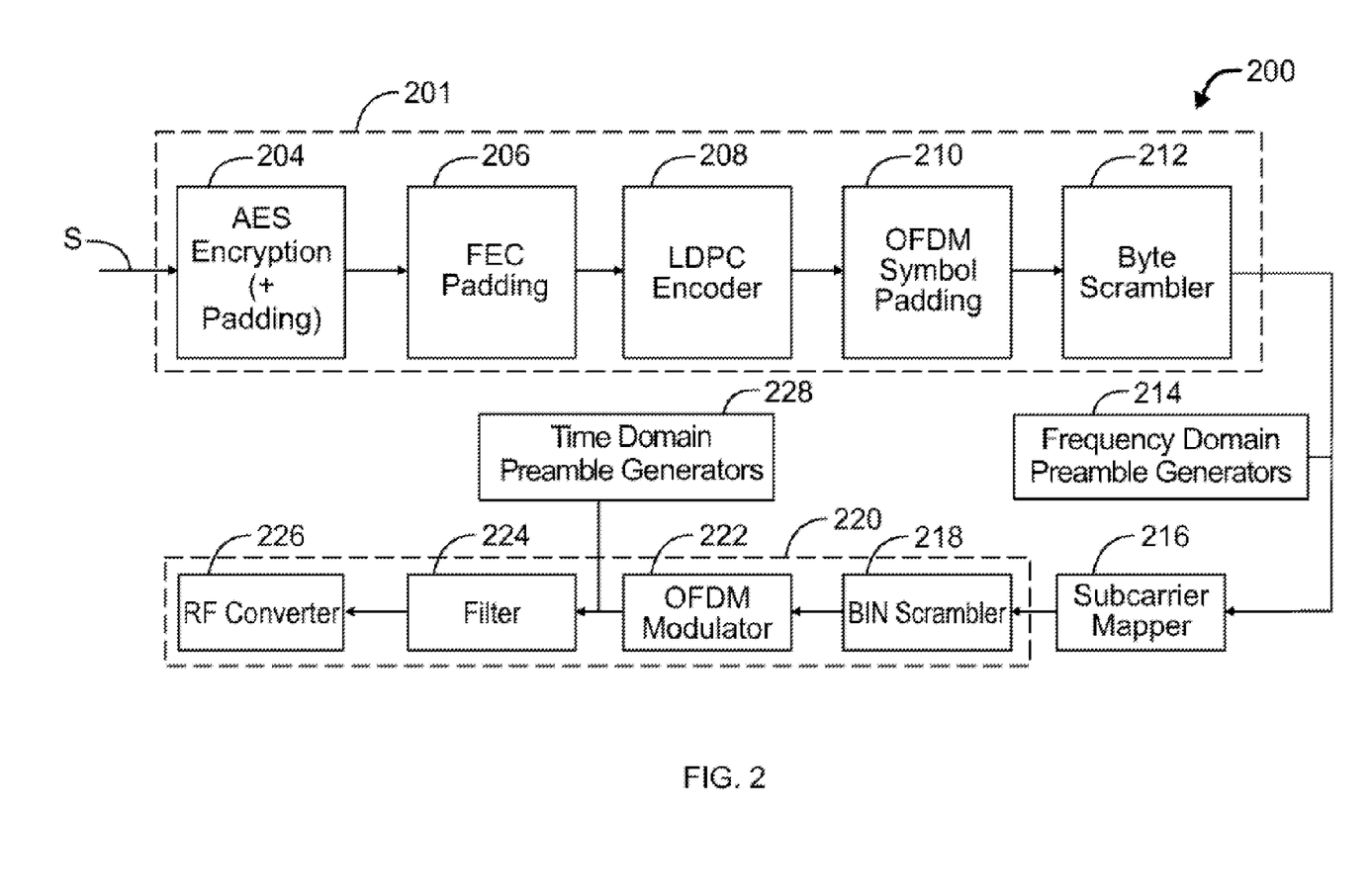
FIG. 2 shows, in part, apparatus that may be used in accordance with the principles of the invention.

FIG. 2 shows illustrative transmitter 200. Transmitter 200 may include preprocessor 201. Frequency domain signal S, which may be a bit stream, may be fed to encryption module 204, which may be an advanced encryption standard ("AES") based module. Module 204 may also provide padding. Signal S may then be passed to forward error correction ("FEC") module 206. Module 206 may provide padding to 2080 or 4160 bits. Signal S may then be passed to low density parity check encoder 208. From encoder 208, signal S may be passed to symbol padding module 210. Module 210 may provide orthogonal frequency domain multiplexing ("OFDM") padding. Signal S may then be passed to byte scrambler 212.

Frequency domain preamble generators 214 may provide frequency domain preambles.

Signal S is then passed to subcarrier mapper 216.

Signal S is then passed to bin scrambler 218 in single transmitter channel 220. Transmitter channel 220 converts signal S into an RF time domain signal.

Transmitter channel 220 may include OFDM modulator 222, filter 224 and RF converter 226. Time domain preamble generators 228 may provide time domain preambles to the signal.

Single channel transmitters may require reduced chip set cost in comparison to that of bonded channel transmitters. When 800 Mbps is not required for transmission, a single channel transmitter may have less overhead than bonded channel transmitters. Single channel transmitters may not require management of between-channel interference or filtering and may not require a guard band.

Transmitters such as 200 may transmit in OFDM transmission mode at 800 Mbps using a single channel transmitter. Illustrative characteristics of the transmission mode, using MoCA 2 as an example, are shown in Table 1.

TABLE 1

Illustrative single transmission channel features.

| Illustrative Feature | Value |
|---|---|
| Sampling rate | 200 MHz (nominal) |
| Sub-carriers | 1024 |
| Maximal CP size | 256 or greater |
| available sub-carriers | 944 or more |
| maximum constellation size | 10 bpcs (QAM1024) or more |
| maximum PHY Rate | >1480 Mbps (on a flat channel, CP = 100, 10 bpsc) or more |
| PHY Rate | >1000 Mbps (on a flat channel, CP = 100, 7 bpsc) or more |

Figure 3:
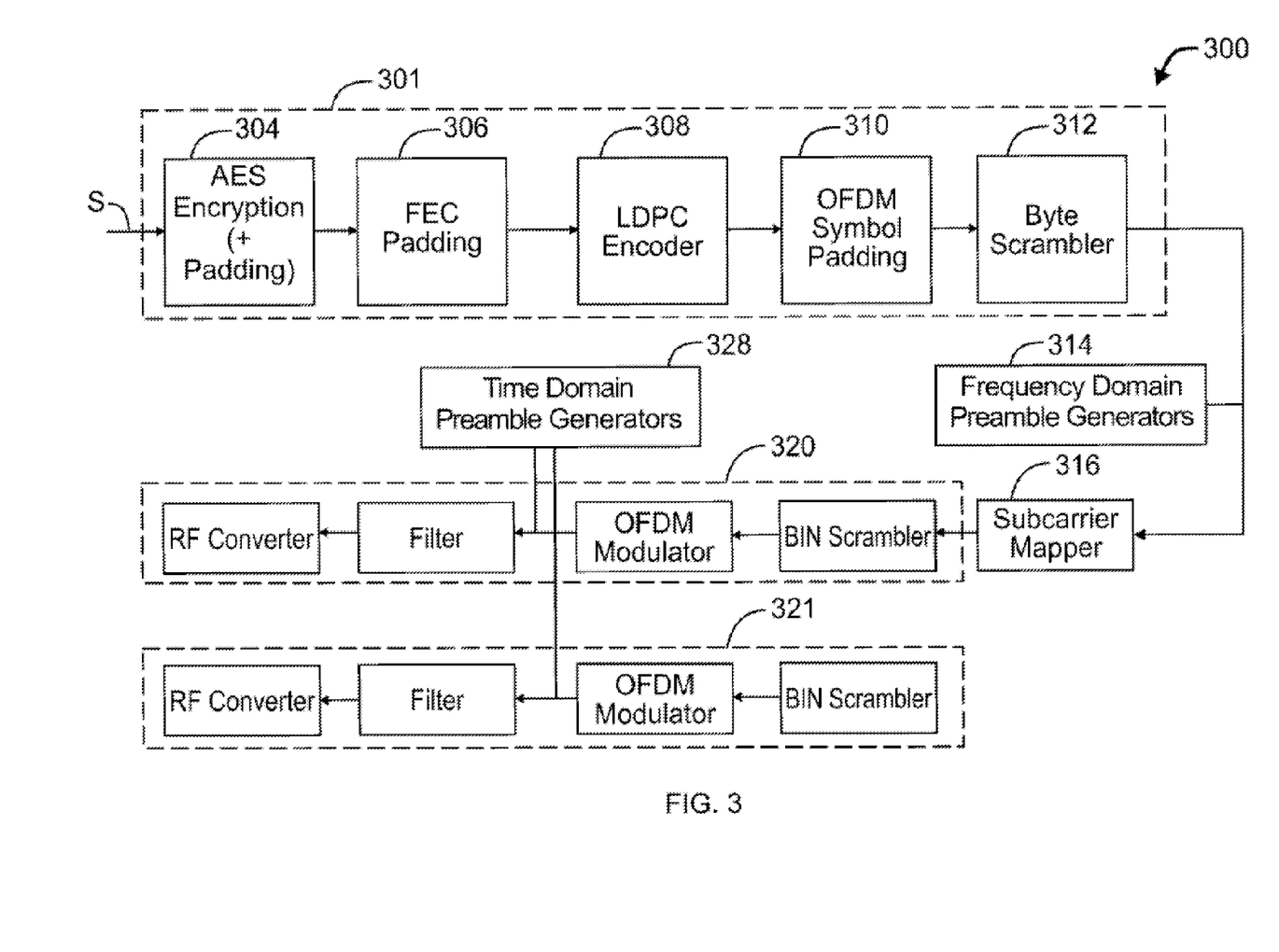
FIG. 3 shows apparatus in accordance with the principles of the invention.

FIG. 3 shows illustrative transmitter 300. Transmitter 300 may include preprocessor 301. Transmitter 300 may include bonded transmission channels 320 and 321. Bonded channels may provide good channel selection. Bonded channels may be physically adjacent each other. Bonded channels may be physically parallel to each other. Each channel of the bonded channels may provide performance that may have one or more of the features identified in Table 1.

Elements 304-316 and 328 of transmitter 300 may be substantially similar, if not identical, to corresponding elements 204-216 and 228 of transmitter 200 (shown in FIG. 2). Channels 320 and 321 may both correspond to channel 220 (shown in FIG. 2). The total throughput of channels 320 and 321 may be about twice that of channel 220.

Channels 320 and 321 may be on the same MoCA band. Each may be compliant with the same baseline PHY layer device. The two channels may transmit simultaneously and may be synchronized. In some embodiments, the two channels may have the same sampling clock and/or the same LO frequency source oscillator. The first bit of preamble for each of the channels may be transmitted on the same sampling clock.

In some embodiments, the two channels may be consecutive in frequency. When the two channels are consecutive in frequency, interference and large differences in attenuations may be reduced.

A MAC interface in communication with transmitter 300 may "see" a single 1024-sub-carrier PHY corresponding to the two different physical channels. Data may be distributed between the two channels according to the bit loading.

The two channels may support a single Probe 1 transmission and report.

Bit loading may be calculated simultaneously on the two channels.

Figure 4:
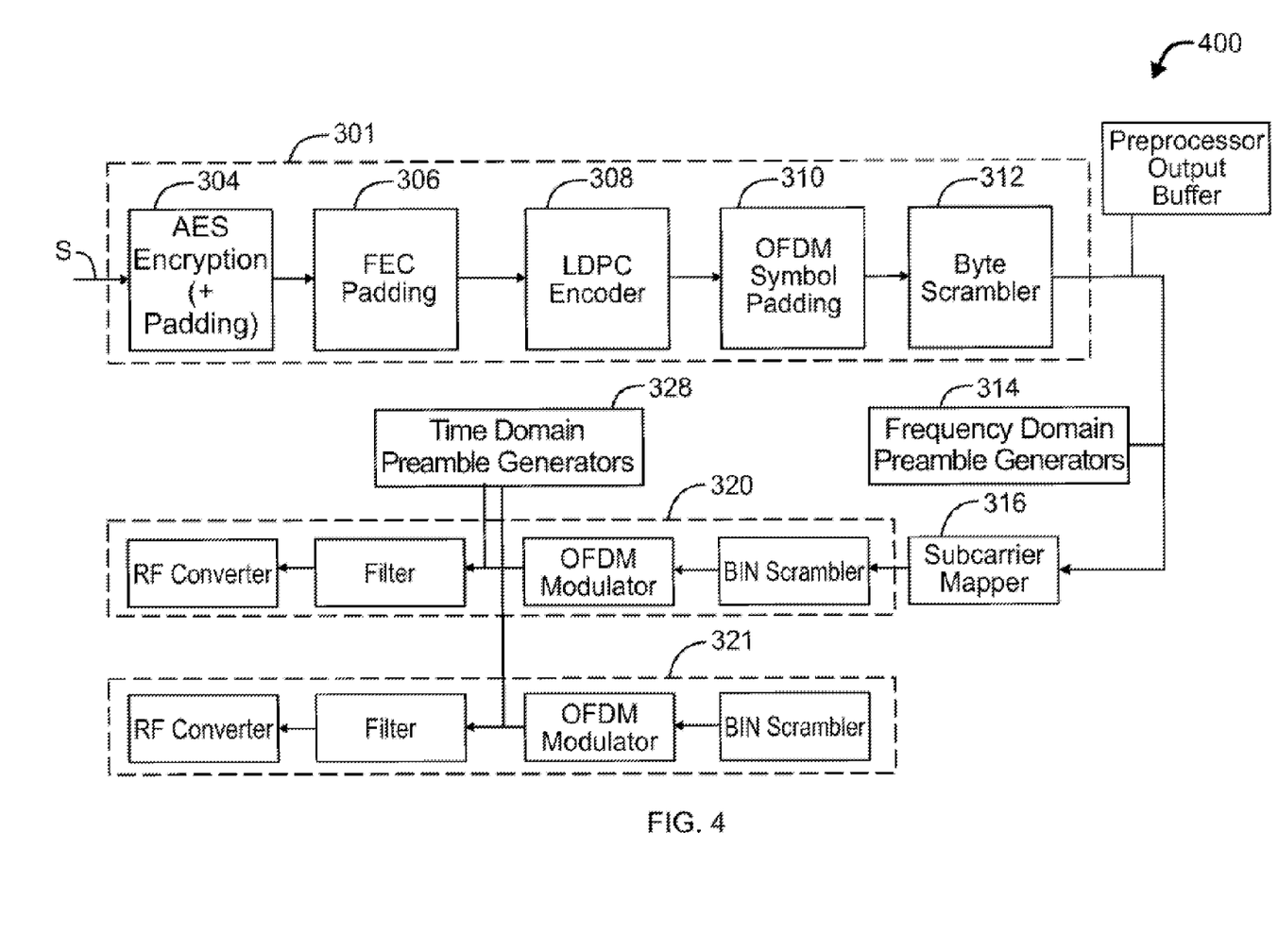
FIG. 4 shows other apparatus in accordance with the principles of the invention.

FIG. 4 shows illustrative transmitter 400. Elements 401-421 of transmitter 400 may correspond to, and may have some or all of the features of, elements 301-321 of transmitter 300 (shown in FIG. 3). Transmitter 400 may include preprocessor output buffer 402. Preprocessor output buffer 402 may store first information packets that are processed by preprocessor 401. While preprocessor output buffer 402 buffers the first information packets, preprocessor 401 may preprocess second information packets. When the second information packets are preprocessed, the first information packets and the second information packets may be, at substantially the same time, transmitted to transmission subcarrier mapper 316 and transmission channels 320 and 321.

Preprocessor output buffer 402 is shown as being upstream from frequency domain preamble generators 314. In some embodiments, preprocessor output buffer 402 may be downstream from frequency domain preamble generators 314. In such embodiments, a preamble for the first information packets may be stored in the preprocessor output buffer.

Thus, systems and methods for transmitting information over a home network have been provided. Persons skilled in the art will appreciate that the present invention can be practiced by other than the described embodiments, which are presented for purposes of illustration rather than of limitation.

What is claimed is:

1. Apparatus for transmitting information over a coax network, the apparatus comprising:
   a physical layer frequency domain signal preprocessor; and
   a physical layer time domain signal transmitter that is configured to receive a signal from the preprocessor and transmit the signal over a coax medium that is in radio frequency communication with a plurality of network nodes, the transmitter having a first transmission channel configured to transmit a first portion of the signal during an identified time period and a second transmission channel configured to transmit a second portion of the signal during the identified time period.

2. The apparatus of claim 1 wherein, when the signal is a MoCA 2 signal, the transmitter is configured to transmit the MoCA 2 signal over the coax medium.

3. The apparatus of claim 1, further comprising a semiconductor chip, wherein:
   the first and second channels are integral to the chip; and
   the first channel is substantially parallel the second channel.

4. The apparatus of claim 1, wherein the first channel is on an identified MoCA band and the second channel is on the identified MoCA band.

5. The apparatus of claim 1, further comprising an oscillator, wherein:
   the first channel is in communication with the oscillator;
   the second channel is in communication with the oscillator;
   the oscillator is configured to generate a timing signal;
   the first channel transmits based on the timing signal; and
   the second channel transmits based on the timing signal.

6. The apparatus of claim 5 wherein, when the first portion includes a first preamble and the second portion includes a second preamble:
   the first channel is configured to transmit the first preamble in response to a trigger in the timing signal; and
   the second channel is configured to transmit the second preamble in response to the trigger.

7. The apparatus of claim 1, wherein:
   the first channel is configured to transmit the first portion at a first frequency;
   the second channel is configured to transmit the second portion at a second frequency; and
   the first frequency is different from the second frequency.

8. The apparatus of claim 1, further comprising a subcarrier mapper, wherein:
   the subcarrier mapper is configured to define the first portion and the second portion based on bit loading.

9. The apparatus of claim 8 wherein:
   the subcarrier mapper is configured to:
      designate the first portion to a first subcarrier; and
      designate the second portion to a second subcarrier; and
   the first subcarrier corresponds to the first transmission channel; and
   the second subcarrier corresponds to the second transmission channel.

10. The apparatus of claim 9 wherein the subcarrier mapper is configured to select, for each of the first and second portions, one of the first and second transmission channels.

11. The apparatus of claim 10 further comprising N −2 additional transmission channels, such that the apparatus comprises N total transmission channels; wherein the subcarrier mapper is configured to select the first and second transmission channels from among the N total transmission channels.

12. The apparatus of claim 11 wherein N equals at least one of 3, 4, or 6.

13. The apparatus of claim 1, wherein the first channel includes a BIN scrambler.

14. The apparatus of claim 13 wherein the first channel includes an OFDM modulator.

15. The apparatus of claim 14 wherein the first channel includes a filter.

16. The apparatus of claim 1, wherein the second channel includes a BIN scrambler.

17. The apparatus of claim 16 wherein the second channel includes an OFDM modulator.

18. The apparatus of claim 17 wherein the second channel includes a filter.

19. The apparatus of claim 1, further comprising a preprocessor output buffer in communication with the physical layer frequency domain signal preprocessor.

20. The apparatus of claim 19 wherein the buffer is configured to store a first output from the preprocessor, the first output corresponding to the first portion of the signal.

21. The apparatus of claim 20 further comprising control logic that is configured to transfer the first output from the buffer to the first channel at substantially a same time as the physical layer frequency domain signal preprocessor transfers a second output to the second transmission channel, the second output corresponding to the second portion of the signal.

22. An apparatus for transmitting information over a coax network, the apparatus comprising:
 a Media Access Control (MAC) layer interface configured to provide a first portion of information packets to a first physical layer time domain signal transmitter and a second portion of the information packets to a second physical layer time domain signal transmitter;
 the first physical layer time domain signal transmitter configured to receive the first portion of the information packets from the MAC layer interface, convert the first portion of the information packets into a first signal, and transmit the first signal comprising the first portion of the information packets over the coax network via a first radio frequency transmission channel; and
 the second physical layer time domain transmitter configured to receive the second portion of the information packets from the MAC layer interface, convert the first portion of the information packets into the first signal, and transmit the second signal comprising the second portion of the information packets over the coax network via a second radio frequency transmission channel,
 wherein a first clock of the first physical layer transmitter and a second clock of the second physical layer transmitter are derived from a common reference frequency.

23. The apparatus of claim 22, wherein the first radio frequency transmission channel comprises a first 100 MHz transmission spectrum and the second radio frequency transmission channel comprises a second 100 MHz transmission spectrum that is proximal to, but non-overlapping with, the first 100 MHz transmission spectrum.

24. A method for transmitting information over a coax network, the method comprising:
 receiving, by a physical layer frequency domain signal preprocessor, information packets and converting the information packets into a signal;
 receiving the signal by a physical layer time domain signal transmitter from the physical layer frequency domain signal preprocessor; and
 transmitting, by the physical layer time domain signal transmitter, a first portion of the signal over the coax network via a first radio frequency transmission channel comprising a first transmission spectrum and a second portion of the signal over the coax network via a second radio frequency transmission channel comprising a second transmission spectrum that is proximal to but non-overlapping with the first transmission spectrum.

25. The method of claim 24, wherein the first transmission spectrum and the second transmission spectrum comprise 100 MHz transmission spectrums.

* * * * *